US006760121B1

(12) United States Patent
Kimura et al.

(10) Patent No.: US 6,760,121 B1
(45) Date of Patent: Jul. 6, 2004

(54) BEAM SCANNING PRINTER

(75) Inventors: Tsutomu Kimura, Saitama (JP); Minoru Takahashi, Saitama (JP); Ko Aosaki, Saitama (JP); Jin Murayama, Miyagi (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/532,519

(22) Filed: Mar. 21, 2000

(30) Foreign Application Priority Data

Apr. 28, 1999 (JP) .......................................... 11-122474

(51) Int. Cl.[7] .......................... G06F 15/00; B41J 15/14
(52) U.S. Cl. .......................... 358/1.7; 358/1.1; 347/243
(58) Field of Search .......................... 358/1.7, 1.1, 1.18, 358/298, 518, 520; 347/243, 260, 261, 235, 237, 233; 355/38, 77

(56) References Cited

U.S. PATENT DOCUMENTS 4,641,950 A 2/1987 Rongen et al. ............. 347/243
4,800,400 A * 1/1989 Douglas ..................... 347/263
4,929,978 A * 5/1990 Kanamori et al. .......... 358/520
5,883,698 A * 3/1999 Kimura ....................... 355/38
6,154,244 A * 11/2000 Eum et al. .................. 347/243

FOREIGN PATENT DOCUMENTS

JP 52-52598 4/1977
JP 55-144264 11/1980
JP 58-92015 11/1983

* cited by examiner

*Primary Examiner*—Twyler Lamb
(74) *Attorney, Agent, or Firm*—Young & Thompson

(57) ABSTRACT

A beam scanning printer which includes a light mixing device for mixing green, red and blue rays radiated from three LEDs with each other and directing the mixed beam to a common converging optical system along a common optical axis is provided. Through the common converging optical system, a beam spot that is common to the three colors is formed. The common beam spot is scanned through a polygonal mirror across a photosensitive material in a main scanning direction as the photosensitive material is moved in a sub scanning direction transverse to the main scanning direction, to record a full-color image on the photosensitive material.

14 Claims, 3 Drawing Sheets

BEAM SCANNING PRINTER

BACKGROUND OF THE INVENTION

1. Field of the Invention

The present invention relates to a beam scanning printer that makes a hard copy of a full-color image representative of an image signal for TV or an electronic image, by projecting scanning beam spots of different colors onto an advancing sheet of photosensitive material, wherein the beam spots of the different colors are formed at the same position in the same size per each pixel.

2. Background Arts

JPA Nos. 52-52598 and 55-144264 and many other prior art materials disclose those optical systems which record an image line by line on a photosensitive material, such as a photosensitive belt or a photosensitive drum, by scanning a laser beam across the photosensitive material through a rotary polygonal mirror. While the laser beam is scanned, the photosensitive material is moved by a mechanism in a transverse direction to the scanning direction, so a two-dimensional image is formed on the photographic material.

JPA No. 58-192015 discloses an optical system, wherein a plurality of light beams projected from a plurality of light sources are scanned through a common rotary polygonal mirror, so a collimator lens is allocated to each of the light sources, to produce parallel rays. The parallel rays are reflected from mirrors so as to position the optical axes of the light sources.

U.S. Pat. No. 4,641,950 published in 1984 discloses a scanning device for optically scanning a light beam along a scanning line to record a line of dots on a photographic sheet, wherein a plate with a slit is placed near the recording surface of the photographic sheet, to shape the scanning line in its widthwise direction.

U.S. Pat. No. 4,800,400 published in 1989 discloses a beam scanning printer that uses light beams of three primary colors, i.e. red, green and blue, from light emitting diodes (LED) for scanning and exposing an instant photographic film. In this beam scanning printer, the red, green and blue LEDs are arranged horizontally at give distance from each other in a light source section. The output light beams from the LEDs travel along different optical axes, and the optical axes are crossed on the recording surface of the instant photographic film, to form a common beam spot to the three colors on the instant photographic film. Thus, three color dots of one pixel are concurrently recorded on the instant photographic film. Through reciprocating movement of a mirror, the common beam spot is scanned across the entire width of the instant photographic film in opposite directions for main scanning as the instant photographic film is moved in a sub scanning direction transverse to the main scanning direction. During the scanning, peak values of the currents supplied to the LEDs are controlled at a high frequency in accordance with data of three color densities of each of many pixels to be recorded sequentially along the scanning lines.

For recording different color dots of one pixel by projecting a beam spot of each color onto a photographic material, it is necessary to form the beam spots of different colors at exactly the same position for each pixel in exactly the same size with respect to all pixels throughout the scanning lines. For this purpose, it is possible to provide a separate lens system for a respective color beam to cross the different optical axes of the different color beams on the recording surface to form a common beam spot. However, this solution would be expensive and need a larger space. On the contrary, to cross the optical axes of the different color beams through a single lens, some of the optical axes should be directed to the single lens in aslant to the optical axis of that lens. In that case, it is very difficult to control the optical axes so as to make the size and the projecting position of the different color beam spots coincident with each other. It is also hard to use an aspherical lens in order to eliminate chromatic aberration where the optical axes of the beams slant to the lens optical axis.

SUMMARY OF THE INVENTION

In view of the foregoing, an object of the present invention is to provide a beam scanning printer that makes it easy to control size and position of beam spots of different colors on a photographic material, that is preferable for miniaturizing and lightening the whole optical system, and that makes it possible to cut the cost of manufacturing.

To achieve the above object, the present invention provides a beam scanning printer that comprises a plurality of light sources that output rays of different colors from each other at individually controllable timing and intensity; a light mixing device for mixing the output rays from the light sources to produce a mixed beam of the different colors with a common optical axis; a converging optical system for converging the mixed beam of the different colors to form a beam spot on a photosensitive material; a scanning device for optically scanning the beam spot across the photosensitive material to provide a scanning line; a device for moving the photosensitive material relative to the scanning device in a direction transverse to the scanning line while holding the photosensitive material in a plane including the scanning line; and a control device for modulating the output rays from the respective light sources in accordance with three color densities of many pixels to be recorded along the scanning lines in synchronism with the scanning of the beam spot and the relative movement of the photosensitive material.

Since the light beams of the different colors are mixed so as to have a common optical axis before being converged, the light beams may be converged at a common focal point with the same diameter through the converging optical system. Because of the common optical axis, lens elements, that constitute the light mixing device, the converging optical system and the scanning device, may have smaller diameters, and also the requisite number of lenses is reduced in total, as compared to a case where the light beams of the different colors are directed along different optical axes to these lenses. Therefore, the beam scanning printer of the present invention gets a large degree of freedom in arrangement of the respective elements, and cuts the cost of design and manufacture. Also the beam scanning printer can be light and small. Because the position and the size of the beam spots of the different colors coincide with each other, a resultant printed image is superior in color definition, gradations, grain texture, and reproduction.

In a preferred embodiment, the output rays radiated from the light sources are converted into parallel rays through collimator lenses placed in front of the respective light sources, and then optical axes of parallel beams of the different colors are aligned through selective reflection surfaces. According to this configuration, it is unnecessary to equalize optical path lengths of the different color light beams. It is not always necessary to make the respective color light beams completely parallel, but they may be slightly radiating on the long wavelength side, or convergent on the short wavelength side, in order to compensate for chromatic aberration of the converging optical system.

According to another embodiment, the radiating beams radiated from the light sources are mixed with each other through a light converging member. The radiating beams are directed to a large-diameter incident surface of the light convergent member, and projected from a small exit surface thereof. The diameter of the exit surface is so small that may be considered to be a point. As being projected from the point, the mixed radiating beam from the light converging member is converted into a substantially complete parallel beam through an appropriate collimator lens. The substantially complete parallel beam of the three colors may be converged through a simple convergent lens to be a common beam spot at a common focal point of the convergent lens by locating the convergent lens at any position on the optical path of the parallel beam.

Using LEDs as the light sources is preferable because a low voltage power source such as a dry cell is enough for driving the LEDs, and their outputs are controllable with high accuracy, speed and fidelity through a simple current control circuit.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
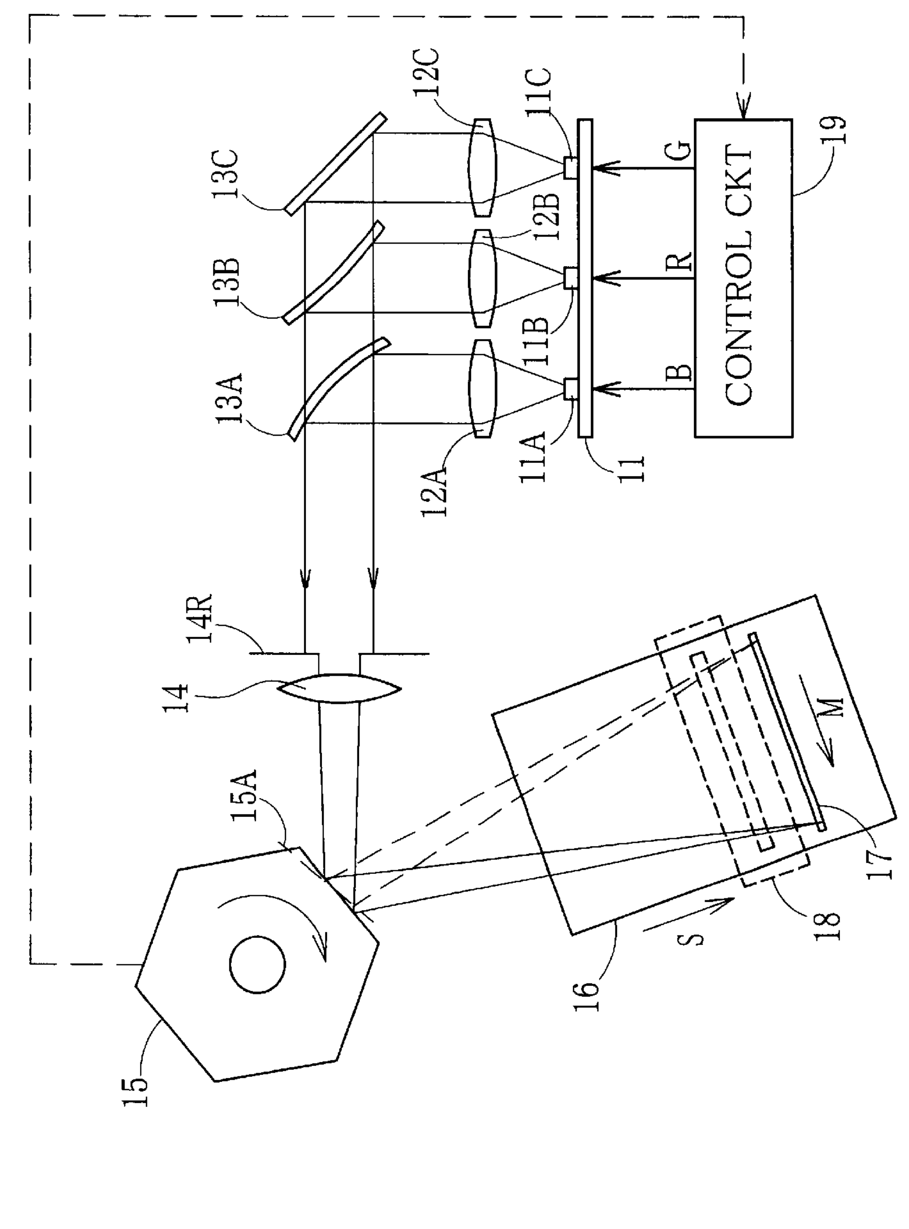
FIG. 1 is an explanatory diagram illustrating essential parts of a beam scanning printer according to an embodiment of the present invention.

In a beam scanning printer shown in FIG. 1, a light source section 11 with three light emitting diodes (LED) 11A, 11B and 11C and a rotary polygonal mirror 15 are used for exposing a sheet of photographic material 16, e.g. an instant photographic sheet, to scanning light beams of red (R), green (G) and blue (B) at the same time.

The three LEDs 11A to 11C respectively emit rays of blue, red and green, and are arranged at distance from each other. The rays from the LEDs 11A to 11C are converted into parallel rays through collimator lenses 12A, 12B and 12C that are located on optical axes of the LEDs 11A to 11C respectively.

A total reflection surface 13C reflects a beam of the green parallel rays from the collimator lens 12C and directs them toward a convergent lens 14 in parallel to an optical axis of the convergent lens 14. A selective reflection surface 13B, which reflects red rays but transmits green rays, reflects a beam of the red parallel rays from the collimator lens 12B and transmits the green light beam from the total reflection surface 13C, such that the optical axes of the red and green light beams coincide with each other. A selective reflection surface 13A, which reflects blue rays but transmits red and green rays, reflects a beam of the blue parallel rays from the collimator lens 12A and transmits the red and green light beams from the selective reflection surface 13B, such that optical axes of the light beams of the three colors coincide with each other.

The respective optical path lengths of the light beams of the three colors do not need to be equalized since their optical axes are aligned after they are converted into parallel beams.

The total reflection surface 13C is a plane surface. On the other hand, the selective reflection surface 13A is slightly concave to slightly converge the blue light beam, whereas the selective reflection surface 13B is slightly convex to slightly radiate the red light beam. The curvatures of the selective reflection surfaces 13A and 13B are determined to compensate for chromatic aberration of the convergent lens 14 between the three colors, so the three color rays are converged at a common focal point through the convergent lens 14. It is also possible to compensate for the chromatic aberration by adjusting the deflective powers of the collimator lenses 12A to 12C.

A mask 14R with an aperture is placed before the convergent lens 14 to equalize beam radiuses of the blue, red and green light beams at incidence on the convergent lens 14. The diameter of the mask aperture corresponds to a beam radius of the blue light beam at incidence on the convergent lens 14, since the blue light beam is slightly converged by the concave selective reflection surface 13A.

The rotary polygonal mirror 15 deflects three color light beams from the convergent lens 14 such that the common focal point is formed on the photographic sheet 16. The rotary polygonal mirror 15 has six reflection surfaces in this embodiment, and continuously turns at a constant speed in a direction as shown by an arrow, so the reflection surfaces sequentially enter the optical path of the three-color light beams from the convergent lens 14 and reflect them such that the common focal point of the converged light beams of the three colors is scanned across the photographic sheet 16 in a main scanning direction M. That is, the common focal point or a beam spot is located at one terminal point of one scanning line 17 when one of the reflection surfaces is in a position as shown by dashed lines 15A. To show the correspondence between the position of the reflection surface and the position of the beam spot, the light path is also shown by dashed lines. On the other hand, when the same reflection surface is in a position as shown by a solid line, the beam spot is located at the other terminal point of the same scanning line 17, as shown by solid lines. According to this embodiment, the common beam spot of the three colors is scanned across the photographic sheet 16 six times per one rotation of the rotary polygonal mirror 15.

The photographic sheet 16 is positioned such that the common beam spot of the three colors are formed on the surface of the photographic sheet 16, and is continuously moved in a sub scanning direction S transverse to the main scanning direction, while keeping the same horizontal position, through a not-shown conveying mechanism. The speed of movement of the photographic sheet 16 is determined such that the photographic sheet 16 moves by one scanning line 17 while the beams spot scans through one scanning line 17. Thus, six scanning lines 17 are formed at regular intervals on the photographic sheet 16 during one rotation of the polygonal mirror 15.

A control circuit 19 is provided for controlling output levels of the LEDs 11A to 11C in accordance with individual density levels of three colors of each pixel of a full-color image to be printed on the photographic sheet 16. Specifically, the control circuit 19 drives the LEDs 11A to 11C to project light pulses simultaneously with each other in synchronism with the rotational movement of the polygonal mirror 15. The number of light pulses of each color projected during one main scanning corresponds to the number of pixels per scanning line 17. The control circuit 19 controls the values of driving current for the LEDs 11A to 11C in accordance with the three color densities of one pixel that is to be recorded at a position on the photographic sheet 16 where the beam spot is formed at that moment.

According to the beam scanning printer of the first embodiment, superior properties of the LED are utilized fully for recording an electronic image onto a photographic sheet. More specifically, with a simple current control circuit, the output has a wide dynamic range, follows the input at a high speed, can be controlled in a flexible and infinite number of level grades, and gains a high fidelity to the input. Accordingly, the beam scanning printer can produce a photo-print that is rich in coloration and high in color reproduction.

Although the current values for driving the LEDs 11A, 11B and 11C are controlled to modulate the light intensities in accordance with the three color densities of each pixel in the above embodiment, it is possible to control driving cycle or time per pixel of the individual LED 11A, 11B or 11C in accordance with the three color densities of each pixel. It is also possible to control exposure amount to each color beam by controlling intensity, driving cycle and driving time in combination.

Since the rays from the LEDs 11A to 11C are converted into parallel rays through the three collimator lenses 12A to 12C, and thereafter the optical axes are aligned through the selective reflection surface 13A and 13B, flexibility in arrangement, i.e., in height as well as in position on the horizontal plane, of the light sources 11A to 11C and the optical system behind the convergent lens 14 is improved. So the optical system may be designed while putting a priority on minimization of the beam scanning printer.

Since the beams of parallel rays of respective colors are converged to be a beam spot through the common convergent lens 14, the requisite number of convergent lenses is reduced as compared to a case where an individual convergent lens is provided for parallel rays of each color.

Since the beams of parallel rays of red, green and blue are directed to the convergent lens 14 in coaxial with the optical axis of the convergent lens 14, the beam spots of the three colors coincide e with each other in position as well as in beam radius throughout the whole length of the scanning line 17. This applies even where the convergent lens 14 is an aspherical lens.

Since the curvature of the selective reflection surface 13A and that of the selective reflection surface 13B are determined to compensate for chromatic aberration of the convergent lens 14, the positions and the beam radiuses of the beam spots of the three colors coincide with each other even more precisely.

Considering the fact that the beam from the LED light source is less easy to converge at a point as compared to a laser beam, it is preferable to place a light-shielding blade 18 with a slit therein over the photographic sheet 16, to shape the scanning line into the same width. The width of the slit may be 100 $\mu$m or so.

In addition to or in place of the optical elements shown in FIG. 1, it is possible to use those optical elements in the beam scanning printer which have been applied to conventional beam scanning printers using a laser beam and a polygonal mirror for scanning. For example, according to a modification shown in FIG. 2, a first focal point is formed on the reflection surface of the rotary polygonal mirror 15 through a convergent lens 14A, and radiating rays reflected from the rotary polygonal mirror 15 are converted into parallel rays through a lens 14B. The beam of parallel rays f from the lens 14B is then converged into a beam spot through a second convergent lens 14C. The convergent lenses 14A and 14C may be F-θ lenses so as to converge the beam only in the vertical direction at the surface of the rotary polygonal mirror 15, in order to absorb errors that could be caused by an inclination of any of the reflection surfaces of the rotary polygonal mirror 15 with respect to a rotational axis thereof.

Although the photographic sheet 16 is moved continuously at the constant speed for sub-scanning in the above embodiment, it is possible to move the photographic sheet 16 intermittently by an amount corresponding to a width of the scanning line 17. Concretely, the LEDs 11A to 11C are driven intermittently such that the three color light beams are projected onto the rotary polygonal mirror 15 for scanning while every other reflection surface of the rotary polygonal mirror 15 is in the scanning position, i.e., in the optical path of the convergent lens 14 or 14A. Whereas the photographic sheet 16 is moved by one scanning line in the sub scanning direction S during the intermittence of the light beams. Thereby, the photographic sheet 16 stays in the same position while the beam spot is scanned in the main scanning direction.

The LEDs 11A to 11C are driven simultaneously in the first embodiment so that red, green and blue image frames of a full-color image are photographed simultaneously on the photographic sheet 16 while the photographic sheet 16 moves from one end to the other end in the sub scanning direction for one time. However, it is possible to photograph a full-color image in a frame sequential fashion, i.e., one color frame per one sub scanning. In that case, the photographic sheet 16 is moved three times in the sub scanning direction.

Figure 3:
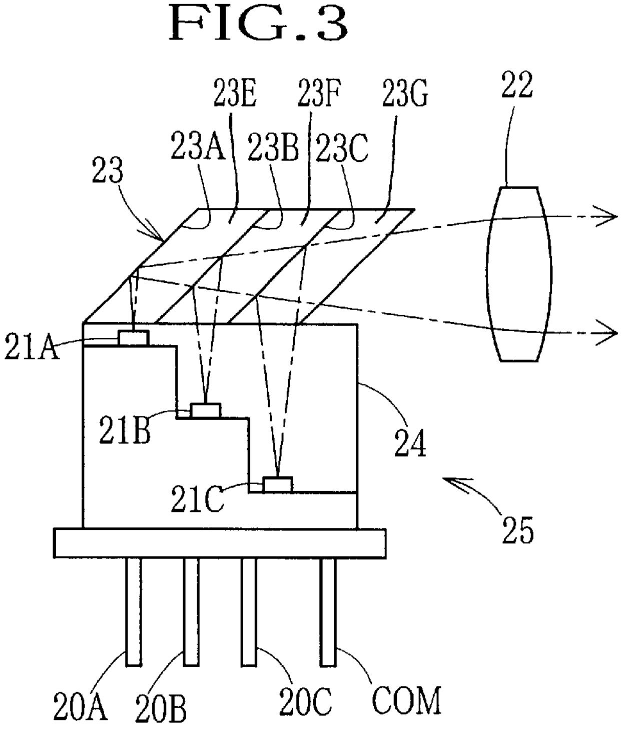
FIG. 3 is an explanatory diagram illustrating a light source unit of a beam scanning printer according to a second embodiment of the present invention.

FIG. 3 shows a light source unit 25 and a collimator lens 22 of a beam scanning printer according to a second embodiment of the invention. As compared to the first embodiment, the second embodiment uses the light source unit 25 and the collimator lens 22 in place of the light source section 11, the collimator lenses 12A to 12C, and the reflection surfaces 13A to 13C.

The light source unit 25 consists of a light source section 24 and a reflector section 23 which are joined together into a small unit. The light source section 24 has red, green and blue LEDs 21A, 21B and 21C, and a common terminal COM and three terminals 20A, 20B and 20C. When the current is conducted between the terminal 20A and the common terminal COM, the LED 21A emits green rays. When the current is conducted between the terminal 20B and the common terminal COM, the LED 21B emits red rays. When the current is conducted between the terminal 20C and the common terminal COM, the LED 21C emits blue rays. The intensity of output rays from the LEDs 21A to 21C may be modulated each individually by controlling the current value.

Three steps of mounting surfaces are formed inside the light source section 24, and one of the LEDs 21A to 21C is molded with a transparent resin onto each step. The reflector section 23 is for aligning optical axes of radiating beams from the LEDs 21A to 21C, and consists of three plates 23E, 23F and 23G, e.g. glass plates, of an equal thickness. The plate 23E is transparent and has a total reflection surface 23A formed on one side thereof. The plates 23F and 23E have selective reflection surfaces 23B and 23C formed on one sides thereof respectively. The three plates 23E, 23F and 23G are joined together into a plate. The total reflection surface 23A is located above the green LED 21A, whereas the selective reflection surfaces 23B and 23C are located above the red LED 21B and the blue LED 21C respectively. The glass plate 23F with the selective reflection surface 23B constitutes a dichroic mirror which reflects red rays but transmits green rays, whereas the glass plate 23G with the selective reflection surface 23C constitutes a dichroic mirror which reflects blue rays but transmits red and green rays. So the green rays from the LED 21A are reflected from the total reflection surface 23A and is transmitted through the selective reflection surfaces 23B and 23C to the collimator lens 22. The red rays from the LED 21B is reflected from the selective reflection surface 23B and is transmitted through the selective reflection surface 23C to the collimator lens 22. The blue rays from the LED 21C is directed toward the collimator lens 22 as being reflected from the selective reflection surface 23C.

The differences in height between the mounting surfaces of the light source section 24 are determined to equalize the optical path lengths from the LEDs 21A to 21C to the exit of the light source unit 25 via the reflection surfaces 23A to 23C.

The LEDs 21A to 21C output radiating rays with narrow divergence angles of beam, and the optical axes of the radiating beams of the three colors are aligned by being reflected from the reflection surfaces 23A to 23B respectively. The coaxial radiating rays from the light source unit 25 are converted into parallel rays through the single collimator lens 22. The parallel rays from the collimator lens 22 are conducted to the rotary polygonal mirror 15 through the convergent lens 14 in the same way as shown in FIG. 1, so a beam spot that is common to the three colors is projected and scanned on the photographic sheet 16.

According to the second embodiment, the total and selective reflection surfaces 23A to 23C and the LEDs 21A to 21C are integrated into a unit wherein these elements are correctly positioned. Therefore, it is easy to design and assemble the optical system in comparison with the case where the optical system is constituted of separate members.

Since the optical axes of the radiating beams from the LEDs 21A to 21C are aligned, and then the coaxial radiating rays are converted into parallel rays through the single collimator lens 22, the number of lenses necessary for constituting the beam scanning printer is reduced as compared to a case where there are individual collimator lenses for the respective LEDs 21A to 21C. Thus, the whole size of the optical system is reduced.

In the second embodiment, the respective optical path lengths from the LEDs 21A to 21C to the collimator lens 22 via the reflector section 23 are made equal to each other by adjusting physical distances from the mounting surfaces for the LEDs 21A to 21C of the light source section 24 to the respective reflection surfaces 23A to 23C. It is alternatively possible to equalize the optical path lengths without equalizing the physical distances, by using transparent light conductors with different refractive indexes in combination with the reflector section 23.

Figure 4:
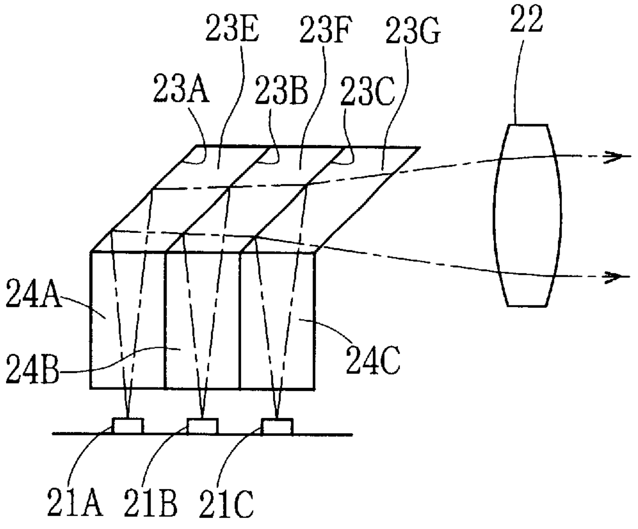
FIG. 4 is an explanatory diagram illustrating a light source unit according to a modification of the second embodiment.

Concretely, according to a modification shown in FIG. 4, the LEDs 21A to 21C are mounted on a horizontal plane at given distance from each other, so the distances from the respective LEDs 21A to 21C to the collimator lens 22 are different. The green rays from the LED 21A are conducted through a light conductor 24A to the total reflection surface 23A. The red rays from the LED 21B are conducted through a light conductor 24B to the selective reflection surface 23B, and the blue rays from the LED 21C are conducted through a light conductor 24C to the selective reflection surface 23C. The light conductor 24A has a lower refractive index than that of the light conductor 24B, whereas the light conductor 24C has a higher refractive index than that of the light conductor 24B. The optical path length is equal to a product of a distance of a light conducting medium by a refractive index of the light conducting medium. Thus, the optical path length through the light conductor 24A is shorter than that through the light conductor 24B, whereas the optical path length through the light conductor 24C is longer than that through the light conductor 24B. These optical path differences between the light conductors 24A to 24C compensate for differences in distance between the respective reflection surfaces 23A to the collimator lens 22, that is, the differences in distance provided by the thickness of the glass plates 23E and 23F. In this way, the respective light path lengths from the LEDs 21A to 21C to the collimator lens 22 through the reflector section 23 are made approximately equal to each other.

It is preferable to curve the selective reflection surfaces 23B and 23C at such curvatures that compensate for the aberration between the color components, in order to focus the three color light beams onto exactly the same point.

Figure 5:
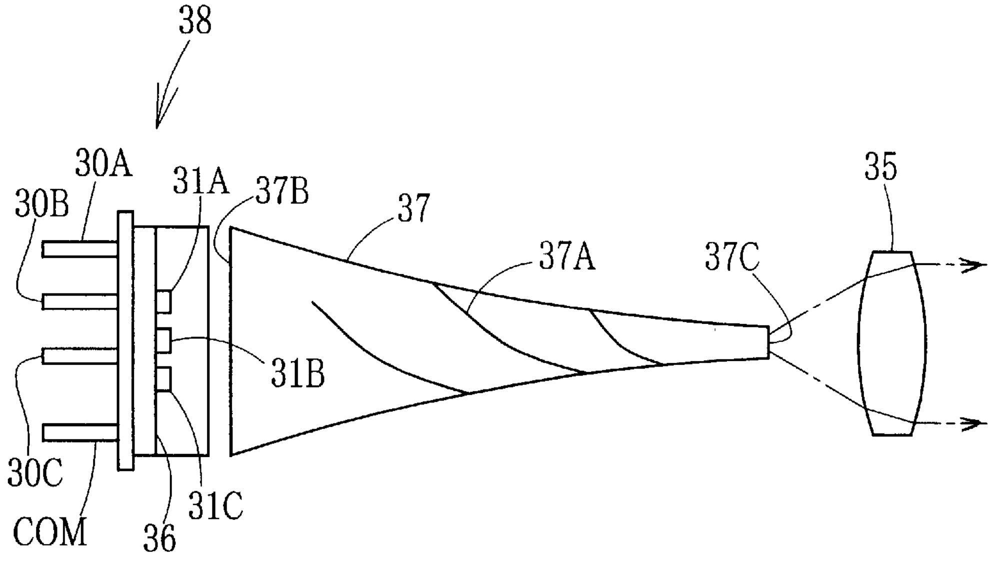
FIG. 5 is an explanatory diagram illustrating a light source section of a beam scanning printer according to a third embodiment of the present invention.

FIG. 5 shows a light source section of a third embodiment that consists of a light source unit 38 and a cone-shaped light converging member 37, and virtually outputs a spot light of the three color.

On a base plate 36 of the light source unit 38, three LEDs 31A, 31B and 31C for blue, red and green are arranged in a line at a distance of 100 $\mu$m from each other. The LED 31A emits green rays when the current is applied between the a terminal 30A and a common terminal COM, the LED 31B emits red rays when the current is applied between a terminal 30B and the common terminal COM, and the LED 30C emits blue rays when the current is applied between a terminal 30C and the common terminal COM. By controlling the current value applied to the individual LED 31A, 31B or 31C, the light intensity of each color and thus the color balance between the three colors may be changed appropriately.

The cone-shaped light converging member 37 is connected to an exit surface of the light source unit 38. The light converging member 37 is a transparent glass member constituted of a core with a high reflective index and a cladding with a low refractive index that is formed with an uniform thickness integrally on an external surface of the core. The peripheral surface of the light converging member 37 is shaped into a long and slender surface of revolution of a logarithmic curve, and has a shallow and smooth spiral groove 37A thereon.

An incident surface 37B of the light converging member 37 is shaped to be flat and plane, and has a diameter of several millimeters in correspondence with the size of the exit surface of the light source unit 38. An exit surface 37C of the light converging member 37 is shaped to be a mirror surface of a diameter of several ten micrometer by cutting and polishing.

The green, red and blue radiating beams from the LEDs 31A to 31C enter through the incident surface 37B and are confined in the light converging member 37. The radiating rays of the beams are mixed in vertical and horizontal directions inside the light converging member 37, so a mixed radiating beam of the three colors is projected from the exit surface 37C. The diameter of the mixed radiating beam at the exit surface 37C is equal to or less than the diameter of the exit surface 37C, i.e., several ten micrometer. The diameter of a beam spot to be finally formed on a recording surface is 100 $\mu$m. Compared to this diameter, the diameter of the exit surface 37C is so small that it may be regarded as a point.

Figure 2:
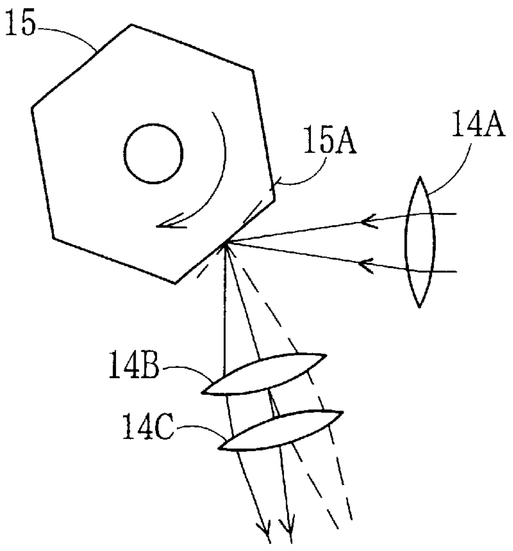
FIG. 2 is an explanatory diagram illustrating an optical system for scanning a beam spot according to a modification of the first embodiment.

According to the third embodiment, the individual beams radiated from the LEDs 31A to 31C are confined in the light converging member 37 so as to be mixed with each other and converged into a point when being radiated from the light converging member 37. As being projected from the point, the mixed radiating beam from the light converging member 37 is converted into a substantially complete parallel beam through a collimator lens 35. The substantially complete parallel beam of the three colors from the collimator lens 35 may be converged through a simple convergent lens at a common focal point of the convergent lens by locating the convergent lens at any position on the optical path of the parallel beam. The focal point of the convergent lens, at which a common beam spot of the three colors is formed, is a conjugate point with respect to the exit surface 37C. That is, a beam spot with a very small diameter that may be considered to be a point is formed from the mixed three-color beam through a simple convergent lens system at a conjugate point with respect to the exit surface 37C. The beam spot may be scanned across the recording surface by use of an appropriate scanning device, e.g. as shown in FIG. 1 or 2. Accordingly, the beam scanning printer of the third embodiment further reduces the number of necessary parts, and thereby cuts the weight, the size and the cost of the beam scanning printer.

Although the present invention has been described with respect to the preferred embodiments shown in the drawings, the present invention is not to be limited to the embodiments but, on the contrary, various modifications will be possible without departing from the scope of claims appended hereto. For example, it is possible to keep the photosensitive material in a fixed position, and move a scanning device in the sub scanning direction while scanning a beam spot in the main scanning direction.

What is claimed is:

1. A beam scanning printer comprising:

a plurality of light sources that output rays of different colors from each other at individually controllable timing and intensity;

a light mixing device for mixing the output rays from the light sources with each other to produce a beam of the different colors along a common optical axis;

a common converging optical system for converging the beam of the different colors from the light mixing device, to form a beam spot of the different colors on a photosensitive material;

a scanning device for optically scanning the beam spot across the photosensitive material to provide a scanning line consisting of a large number of pixels;

a device for moving the photosensitive material relative to the scanning device in a direction transverse to the scanning line while holding the photosensitive material in a plane including the scanning line, to provide a plurality of scanning lines; and a control device for modulating the output rays from the respective light sources in accordance with color densities of each individual pixel to be recorded sequentially on the photosensitive material along the scanning lines, in synchronism with the scanning of the beam spot and the relative movement of the photosensitive material, wherein the light mixing device comprises a reflection device with a plurality of reflection surfaces including selective reflection surfaces, each of the selective reflection surfaces reflecting a particular color component but transmitting other color components, the reflection surfaces being arranged in correspondence with the light sources so as to reflect the output rays of the different colors individually and align optical axes of the output rays of the different colors with one another.

2. A beam scanning printer as claimed in claim 1, wherein the light mixing device further comprises collimator lenses placed between the respective light sources and the corresponding reflection surfaces, for converting the output rays radiated from each of the light sources into a parallel beam of a respective one of the different colors and directing the parallel beams of the different colors to the corresponding reflection surfaces, thereby to align optical axes of the parallel beams of the different color with one another to produce a parallel beam of the different colors along the common optical axis.

3. A beam scanning printer as claimed in claim 1, wherein the light mixing device further comprises a device for equalizing optical path lengths from the respective light sources to the converging optical system via the reflection device, and the reflection surfaces individually reflects the output rays radiated from the light sources so as to align optical axes of the radiating output rays of the different colors with one another to produce a radiating beam of the different colors along the common optical axis.

4. A beam scanning printer as claimed in claim 3, wherein the converging optical system includes a collimator lens located on the common optical axis of the radiating beam of the different colors for converting the radiating beam into a parallel beam, and a convergent lens for converging the parallel beam at a point.

5. A beam scanning printer as claimed in claim 4, wherein the device for equalizing the optical path lengths consists of mounting surfaces for mounting the light sources thereon, the mounting surfaces having different height from each other to differentiate distances from the respective light sources to the corresponding reflection surfaces, so as to compensate for differences in distance from the respective reflection surfaces to the converging optical system.

6. A beam scanning printer as claimed in claim 4, wherein the device for equalizing the optical path lengths consists of transparent light conducting members placed between the respective light sources and the corresponding reflection surfaces, the light conducting member having different refractive indexes to differentiate optical path lengths from the light sources to the corresponding reflection surfaces, so as to compensate for differences in distance from the respective reflection surfaces to the converging optical system.

7. A beam scanning printer as claimed in claim 5, wherein the light source, the selective reflection device and the device for equalizing the optical path lengths are integrated into a unit.

8. A beam scanning printer as claimed in claim 1, wherein at least one of the selective reflection surfaces is curved in a direction at a curvature to compensate for chromatic aberration of the converging optical system between the different colors.

9. A beam scanning printer as claimed in claim 1, wherein the light sources include three light emitting diodes respectively emitting green, red and blue rays.

10. A beam scanning printer as claimed in claim 1, wherein the scanning device is mounted stationary, and the photosensitive material is moved continuously at a constant speed or intermittently by an amount corresponding to a width of the scanning line.

11. A beam scanning printer as claimed in claim 6, wherein the light source, the selective reflection device and the device for equalizing the optical path lengths are integrated into a unit.

12. A beam scanning printer comprising:

a plurality of light sources that output rays of different colors from each other at individually controllable timing and intensity;

a light mixing device for mixing the output rays from the light sources with each other to produce a beam of the different colors along a common optical axis;

a common converging optical system for converging the beam of the different colors from the light mixing device, to form a beam spot of the different colors on a photosensitive material;

a scanning device for optically scanning the beam spot across the photosensitive material to provide a scanning line consisting of a large number of pixels;

a device for moving the photosensitive material relative to the scanning device in a direction transverse to the scanning line while holding the photosensitive material in a plane including the scanning line, to provide a plurality of scanning lines; and a control device for modulating the output rays from the respective light sources in accordance with color densities of each individual pixel to be recorded sequentially on the photosensitive material along the scanning lines, in synchronism with the scanning of the beam spot and the relative movement of the photosensitive material, wherein the light mixing device comprises a light converging member that is made from a transparent material, and has a large-diameter incident surface optically connected to the respective light sources, and a small-diameter exit surface directed to the converging optical system, wherein the output rays of the light sources entering through the incident surface are confined and mixed with each other in the light converging member, and are projected from the exit surface as a radiating beam of the different colors with the common optical axis.

13. A beam scanning printer as claimed in claim 12, wherein the light converging member is a cone-shaped transparent glass member constituted of a core with a high reflective index, a cladding with a low refractive index that is formed integrally on an external surface of the core, and a shallow and smooth spiral groove formed on a peripheral surface of the light converging member.

14. A beam scanning printer comprising:

red, green and blue light emitting diodes that are sequentially driven to output rays of red, green and blue at individually controllable timing and intensity;

a common converging optical system for converging the output rays from each of the light emitting diodes to form a beam spot of each color on a photosensitive material;

a device for directing the output rays from the light emitting diodes to the converging optical system along a common optical axis;

a scanning device for optically scanning the beam spot of each color across the photosensitive material to record a large number of dots of each color along a scanning line;

a device for moving the photosensitive material relative to the scanning device in a direction transverse to the scanning line, while holding the photosensitive material in a plane including the scanning line, the device moving the photosensitive material at least three times relative to the scanning device for recording a full-color image; and a control device for controlling driving current to the light emitting diodes in accordance with densities of three color dots to be recorded sequentially on the photosensitive material along the scanning lines, in synchronism with the scanning of the beam spot and the relative movement of the photosensitive material, wherein one of the light emitting diodes is driven during a one-way movement of the photosensitive material relative to the scanning device;

wherein the device for directing the output rays comprises a reflection device with a plurality of reflection surfaces including selective reflection surfaces, each of the selective reflection surfaces reflecting a particular color component but transmitting other color components, the reflection surfaces being arranged in correspondence with the light sources so as to reflect the output rays of the different colors individually and align optical axes of the output rays of the different colors with one another.

* * * * *